United States Patent [19]

Miyakawa et al.

[11] 4,330,995
[45] May 25, 1982

[54] MASTER CYLINDER APPARATUS

[75] Inventors: Yoshitaka Miyakawa, Kawagoe; Makoto Sato, Kamifukuoka; Etsuo Fujii, Wako, all of Japan

[73] Assignee: Honda Giken Kogyo Kabushiki Kaisha, Tokyo, Japan

[21] Appl. No.: 215,914

[22] Filed: Dec. 12, 1980

Related U.S. Application Data

[63] Continuation of Ser. No. 9,837, Feb. 6, 1979, abandoned.

[30] Foreign Application Priority Data

Feb. 16, 1978 [JP] Japan .................. 53-17729[U]

[51] Int. Cl.³ .................................................. B60T 11/20
[52] U.S. Cl. ........................................... 60/562; 60/589
[58] Field of Search ................. 60/562, 581, 585, 589; 251/149.6

[56] References Cited

U.S. PATENT DOCUMENTS 2,060,854 11/1936 Carroll ................................ 60/581
2,205,806 6/1940 Belenkij ............................. 60/589
3,729,932 5/1973 Nakashima ........................ 60/562
4,175,392 11/1979 Morimoto .......................... 60/581

FOREIGN PATENT DOCUMENTS 2426153 12/1974 Fed. Rep. of Germany ........ 60/585

Primary Examiner—Abraham Hershkovitz
Attorney, Agent, or Firm—Armstrong, Nikaido, Marmelstein & Kubovcik

[57] ABSTRACT

A master cylinder apparatus of a type of wherein a master cylinder which is in communication through a connecting port with an oil reservoir on its upper side. A piston is provided having at its front and rear surfaces respective elastic cups, whereby the piston may be pushed to advance against the action of a spring on its front side by a push rod. The piston comprises a front main piston and a rear subsidiary piston connected thereto, and is further defined by an axially extending return port communicating between front and rear oil chambers and with a check valve interposed in the return port arranged to be closed by the action of a releasable spring supported by a stopper at the rear surface, during advance motion of the piston.

2 Claims, 4 Drawing Figures

MASTER CYLINDER APPARATUS

This is a continuation of application Ser. No. 9,837 filed Feb. 6, 1979, now abandoned.

BACKGROUND OF INVENTION

This invention relates to a master cylinder apparatus chiefly used in a brake apparatus for a motorcar.

In an apparatus of this kind, there has been hereto known arrangements such as, for instance, there shown in FIG. 1, in which a master cylinder c is in communication through a port b with an oil reservoir a on its upper side, and is provided therein with a piston f having on its front and rear surfaces respective elastic cups d, e so that the piston f may be pushed to advance against the action of a spring h on its front side by a push rod g.

It has been usual with the prior art arrangement that an oil chamber i on a front side of the piston f communicates with the foregoing upper oil reservoir a through a return port j provided on its rear and upper wall. This conventional arrangement, however, is defective in that on every operation of the piston f, the front elastic cup d slides to move forwardly and rearwardly along on and across the lower end surface of the port j, and thus the cup d is liable to become damaged through coaction with port j.

SUMMARY OF INVENTION

This invention has for its object to provide an apparatus free from the foregoing defects.

The principal feature of the present invention is directed to a master cylinder apparatus of a type of wherein a master cylinder is in communication through a connecting port with an oil reservoir on its upper side, and is provided therein with a piston having at its front and rear surfaces respective elastic cups, whereby the piston may be pushed to advance against the action of a spring on its front side by a push rod, wherein: the piston comprises a front main piston and a rear subsidiary piston connected thereto, and is further defined by an axially extending return port communicating between front and rear oil chambers and with a check valve interposed in said return port arranged to be closed by the action of a releasable spring supported by a stopper at the rear surface, during advance motion of said piston.

Other features include an apparatus where check valve comprises a ball valve, and the same is contained in a valve chamber formed in said main piston and is urged toward its closing side by said releasable spring on its front side and is provided on its rear side with a T-shaped pushing member for pushing the same toward its opening side.

Other objects and advantages will best be understood with respect to the accompanying specification, claims and drawings:

IN THE DRAWINGS

DESCRIPTION OF INVENTION

Figure 1:
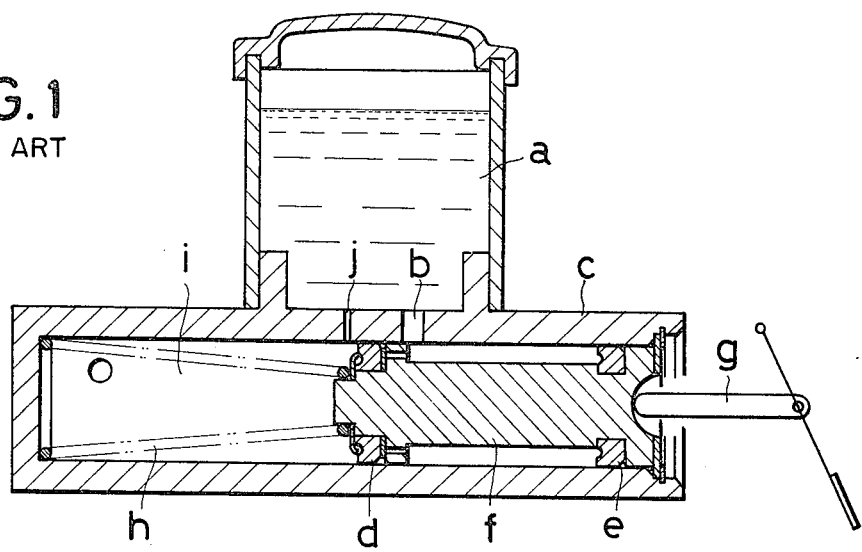
FIG. 1 is an explanatory diagram of a conventional example.

According to this invention, in such an arrangement of the apparatus that a master cylinder 3 is in communication through a port 2 with an oil reservoir on its upper side and is provided therein with a piston 6 having on its front and rear surfaces respective elastic cups 4, 5. The piston 6 therefore, may be pushed to advance against the action of a spring 8 on its front side by a push rod 7. The piston 6 comprises a front main piston 9 and a rear subsidiary piston 10 connected thereto, and the same is provided with an axially extending return port 13 communicating between front and rear oil chambers 11, 12 and with a check valve 16 interposed in the return port 13 and arranged to be closed by the action of a spring 15 after release from stopper 14 at the rear side, by the time of advance motion of the piston 6.

Figure 2:
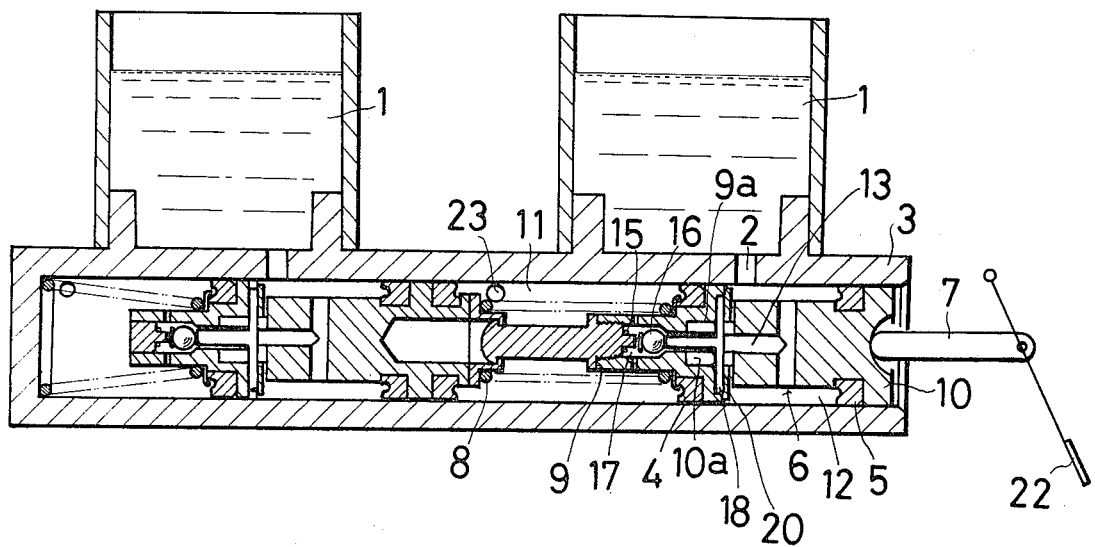
FIG. 2 is a sectional side view of one example of this invention apparatus.
Figure 3:
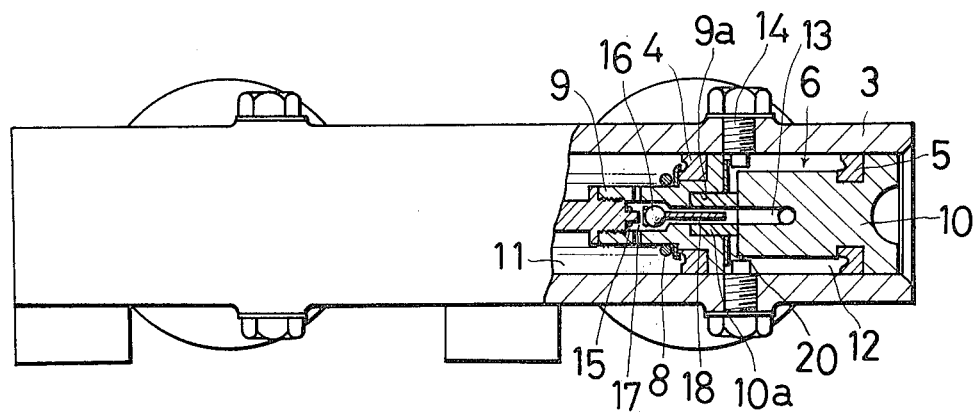
FIG. 3 is a bottom side view, partly in section, of the same.
Figure 4:
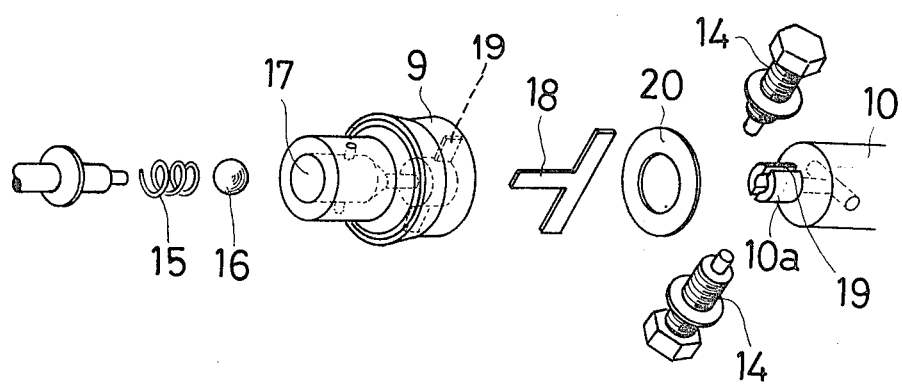
FIG. 4 is an exploded perspective view of a portion thereof.

One embodying example is shown in FIGS. 2 to 4. In the illustrated embodiment, the apparatus is provided additionally with another oil reservoir 1 and another piston 6 on its front side, so that the whole thereof is constructed to be of a tandem type.

The check valve 16 comprises a ball valve, and the same is contained in a valve chamber 17 formed in the main piston 9 and is urged toward its rearward closing side by a spring 15 on its front side. There is provided on a rear side, a T-shaped pushing member 18 for pushing the valve 16 toward its forward opening side in such a manner that the member 18 is mounted at its rear end in a slit 19 made in front end portion 10a of the subsidiary piston 10. Member 18 is movable forwardly and rearwardly so as to be brought into engagement through a washer 20 disposed behind the same, with the stopper 14 behind the washer 20. The stopper 14 comprises, as shown clearly in FIGS. 3 and 4, a bolt screwed in the side wall of the cylinder 3 so as to project into the cylinder 3, and a pair of the same are provided on the right and left sides thereof. The foregoing front end portion 10a is made smaller in diameter and is mounted in an axial bore 9a made in the rear surface of the main piston 9. As shown in the drawings, a pedal 22 is connected to the rear end of the push rod 7, and an outlet opening 23 is in the front portion of the oil chamber 11.

If the pedal 22 is in its inoperative condition, as illustrated, the piston 6 is returned by the action of the front spring 8. In this case, as shown clearly in FIG. 3, the main piston 9 is brought into abutment from front through its rear washer 20 with the stopper 14 and is stopped at that position. Consequently, the washer 20 pushes and opens the front check valve 16 through the front pushing member 18 against the action of the spring 15, so that the return port 13 is brought into its open condition. Accordingly, the front and rear oil chambers 11, 12 are brought into a condition that the two are in communication one with another and are in communication through the port 2 with the oil reservoir 1. If the pedal 22 is next pushed, the piston 6 is thereby pushed to advance against the action of the spring 8. By the advance motion of the main piston 9, in this case, the rear washer 20 is released from being held against the stopper 14 by the piston 9 and becomes free. The front pushing member 18 also becomes free, and consequently the valve 16 is released from the foregoing stopped condition and is pushed rearward to close by the action of the spring 15. Thus, the return port 13 is closed at its middle portion, so that the oil in the front oil chamber 11 is confined in a tightly sealed condition and is under pressure in proportion to the advance motion of the piston 6 and is led to a load such as a brake cylinder or the like through the front outlet opening 23.

BEST MODE OF INVENTION

A master cylinder apparatus of a type of wherein a master cylinder 3 which is in communication through a connecting port 2 with an oil reservoir 1 on its upper side, and is provided therein with a piston 6 having at its front and rear surfaces respective elastic cups 4, 5, whereby the piston 6 may be pushed to advance against the action of a spring 8 on its front side by a push rod 7, wherein: the piston 6 comprises a front main piston 9 and a rear subsidiary piston 10 connected thereto, and is further defined by an axially extending return port 15 communicating between front and rear oil chambers 11, 12 and with a check valve 16 interposed in said return port 13 and arranged to be closed by the action of a releasable spring 15 supported by a stopper 14 at the rear surface, during advance motion of said piston 6.

Thus, according to the invention, the return port 13 is made in the axial direction in the piston 6 and the same is arranged to be opened and closed by the check valve 16 provided in the middle thereof, so that the foregoing defects in the conventional apparatus do not exist and the port 13 exists on the slide movement passage of the front elastic cup 4 of the piston 6. In other words the cup 4 can be prevented from being damaged and consequently the apparatus can be used over a long period of time.

Many modifications and variations of the present invention are possible in light of the above teachings. It is, therefore, to be understood that within the scope of the appended claims, the invention may be practiced otherwise than as particularly described.

What is claimed is:

1. A master cylinder apparatus of the type wherein a master cylinder is in communication through a connecting port with an oil reservoir on its upper side, and is provided therein with a piston having at its front and rear surfaces respective elastic cups, whereby the piston may be pushed to advance against the action of a spring on its front side by a push rod, wherein: the piston comprises a front main piston and a rear subsidiary piston connected thereto having an axially extending return port communicating between front and rear oil chambers and with a check valve interposed in said return port, said check valve being arranged to be closed by action of a spring, and said check valve being arranged to be held open when said valve is supported by a stopper from the rear side thereof, said check valve comprising a ball valve, and the same is contained in a valve chamber formed in said main piston and is urged toward its closing side by said spring on its front side and is provided on its rear side with a T-shaped pushing member for pushing the same toward its opening side, said pushing member being arranged to be brought into engagement through a washer on its rear side with said stopper provided behind the washer and wherein said stopper comprises a bolt screwed in the side wall of said cylinder, said subsidiary piston being made smaller in diameter at a front end portion and being mounted at said portion in an axial bore made in the rear surface of the main piston, said washer being freely movable on said smaller diameter portion of said subsidiary piston in floating relationship therewith, said front end portion having a slit made therein, and said pushing member is freely movable within said slit in floating relationship therewith.

2. In a master cylinder arrangement for a hydraulic brake of the type including a cylinder, a double piston reciprocatable within the cylinder, resilient means urging the piston to a retracted position and into abutment with a stop member, a valve controlled passage extending from a working face of the piston to a position between the respective piston portions thereof, and a member for opening said valve as said piston approaches said stop member, the improvement comprising:

a first piston portion of said piston having an axial bore and a passage extending through said first piston portion and which connects at its respective ends with a working face of said first piston portion and said axial bore;

a second piston portion having a radial face and having an axial extension projecting from said radial face, said axial extension being received within said axial bore of the first piston portion, said radial face having a diameter less than the diameter of said first and second piston portions, and said axial extension having an axial length greater than the depth of said bore of the first piston portion for said radial face to be spaced from the juxtaposed end of said first piston portion;

an annular washer freely slidable and floatingly received on said axial extension, and which has a diameter greater than that of said radial face for it to be engaged by said stop member;

a T-shaped member positioned within complimentary diametrically extending slots in said first piston portion and said axial extension of said second piston portion with a bar of said T-shaped member extending diametrically of and perpendicular to said washer and the stem thereof extending axially through said passage of the first piston portion, the bar of said T-shaped member being dimensioned for it to have clearance in all directions from the walls defining said diametrically extending slots, and the stem of said T-shaped member being dimensioned for it to have clearance from the wall defining said passage, said T-shaped member being freely movable within said slots and said passage in floating relationship to the walls thereof; and a resiliently loaded valve member normally closing said passage in said first piston portion, and which is moved off a seating therefor by the stem of said T-shaped member upon said washer engaging said stop member and said first piston portion moving into engagement with said washer under the influence of said resilient means urging the piston to a retracted position.

* * * * *